United States Patent
Naulleau et al.

(10) Patent No.: US 6,195,169 B1
(45) Date of Patent: Feb. 27, 2001

(54) PHASE-SHIFTING POINT DIFFRACTION INTERFEROMETER GRATING DESIGNS

(75) Inventors: Patrick Naulleau, Oakland; Kenneth Alan Goldberg, Berkeley; Edita Tejnil, San Carlos, all of CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/176,695

(22) Filed: Oct. 21, 1998

(51) Int. Cl.[7] .................................................. G01B 9/02
(52) U.S. Cl. ....................................... 356/498; 356/499
(58) Field of Search ................................ 356/357, 354, 356/359

(56) References Cited

PUBLICATIONS

Naulleau, Patrick, et al. "Characterization of the accuracy of EUV phase–shifting point diffraction interferometry", *SPIE*, v. 3331 (1998) 114–123.

Anderson, Erik H., et al., "Electron beam lithography digital pattern generator and electronics for generalized curvilinear structures", *J. Vac. Sci. Technol.B*, vol. 13, No. 6, (1995) 2529–2534.

Brophy, Chris P., "Effect of intensity error correlation on the computed phase of phase–shifting interferometry", *J. Opt. Soc. Am. A*, vol. 7, No. 4 (1990) 537–541.

Medecki, H., et al., "Phase–shifting point diffraction interferometer" *Optics Letters*, vol. 21, No. 19 (1996) 1526–1528.

*Primary Examiner*—Robert Kim
(74) *Attorney, Agent, or Firm*—Burns, Doane, Swecker & Mathis, L.L.P.

(57) ABSTRACT

In a phase-shifting point diffraction interferometer, by sending the zeroth-order diffraction to the reference pinhole of the mask and the first-order diffraction to the test beam window of the mask, the test and reference beam intensities can be balanced and the fringe contrast improved. Additionally, using a duty cycle of the diffraction grating other than 50%, the fringe contrast can also be improved.

8 Claims, 6 Drawing Sheets

PHASE-SHIFTING POINT DIFFRACTION INTERFEROMETER GRATING DESIGNS

The U.S. Government has certain rights in this invention pursuant to Contract No. DE-AC03-76SF00098 between the United States Department of Energy and the University of California for operating Lawrence Berkeley National Laboratory.

BACKGROUND OF THE INVENTION

1. Field of the Invention

The present invention relates to interferometers for making highly accurate measurements of wavefront aberrations, particularly to phase-shifting point diffraction interferometers.

2. State of the Art

Optical metrology is the study of optical measurements. An area of optical metrology relevant to the present invention is the use of an interferometer to measure the quality of a test optic, such as a mirror or a lens.

One important recent application of optical metrology is the testing of projection optics for photolithography systems. Modern photolithography systems used to fabricate integrated circuits must continually image smaller features. To do so, systems are confronted with the diffraction limit of the light employed to image a pattern provided in a reticle. To meet this challenge, photolithographic systems must employ successively shorter wavelengths. Over the history of integrated circuit fabrication technology, photolithography systems have moved from visible to ultraviolet and will eventually move to even shorter wavelengths, such as extreme ultraviolet.

Because of the increasing difficulties posed by directly imaging a reticle pattern onto a wafer, it is desirable to use projection optics in lithography systems. Such systems include lenses or other optical elements that reduce the reticle images and project them onto the wafer surface. This allows reticles to retain larger feature sizes, thus reducing the expense of generating the reticle itself.

As with all optical imaging systems, various aberrations such as spherical aberration, astigmatism, and coma may be present. These aberrations must be identified and removed during the fabrication and/or alignment of the projection optics, or the projection optics will introduce substantial blurring in the image projected onto the wafer.

In order to test the projection optics for various aberrations, interferometers may be employed. Conventional interferometers, based upon the Michelson design, for example, employ a single coherent light source (at an object plane) which is split into a test wave and a reference wave. The test wave passes through the optic under test and the reference wave avoids that optic. The test and reference waves are recombined to generate an interference pattern or interferogram. Analysis of the interferogram and resultant wavefront with, for example, Zernike polynomials, indicates the presence of aberrations.

The reference wave of the interferometer should be "perfect"; that is, it should be simple and well characterized, such as a plane or spherical wave. Unfortunately, beam splitters and other optical elements through which the reference beam passes introduce some deviations from perfection. Thus, the interferogram never solely represents the condition of the test optic. It always contains some artifacts from the optical elements through which the reference wave passes. While these artifacts, in theory, can be separated from the interferogram, it is usually impossible to know that a subtraction produces a truly "clean" interferogram.

To address this problem, "point diffraction interferometers" have been developed. An example of a point diffraction interferometer is the phase-shifting point diffraction interferometer described in the article H. Medecki, "Phase-Shifting Point Diffraction Interferometer", Optics Letters, 21(19), 1526–28 (1996), and in the U.S. patent application "Phase-Shifting Point Diffraction Interferometer", Inventor Hector Medecki, Ser. No. 08/808,081, filed Feb. 29, 1997 now U.S. Pat. No. 5,835,217, which are both incorporated herein by reference. Referring to FIG. 1, in this prior art phase-shifting point diffraction interferometer, electromagnetic radiation is sent to a pinhole 22. The radiation is then sent through the test optic 24 to a grating 26. Equivalently, the order of the grating and the test optic may be reversed. The grating 26 produces two beams with a small angular separation. An opaque mask, placed near the focal point of the test optic, contains a tiny reference pinhole, and a larger window centered on the respective foci of the two beams. The reference pinhole produces a reference wavefront by diffraction, while the window transmits the test wave without significant spatial filtering or attenuation. In effect, the beam going through the reference pinhole is filtered to remove the aberrations imparted by the test optic thereby producing a clean reference wave. The two beams propagate to a mixing plane where they partially overlap to create an interference pattern recorded on a detector 30. The light in the interferometer will typically be of a single wavelength. The grating 26 will transmit the zeroth- order beam straight through, but will produce a small angular change to the first-order diffractions. In the image plane 28, the zeroth-order, and the first-order diffractions will be in different positions, as indicated by the reference pinhole and the test window in the mask 28. The zeroth-order goes to the test beam window and the first-order goes to the reference pinhole. Phase-shifting is provided by translating the grating 26 perpendicular to the rulings of the grating. Phase-shifting improves the accuracy of the system.

The phase-shifting point diffraction interferometer tends to suffer from relatively low fringe contrast which makes the signal more susceptible to noise and therefore has the potential of limiting the accuracy of the interferometry. This low contrast is due to the imbalance between the zeroth-order test beam and the first-order reference beam and the imbalance is further aggravated by the spatial filtering of the reference beam. As is apparent, there is a need for improving the fringe contrast and thus the signal-to-noise ratio.

Previous endeavors to achieve test beam balance include, for example, increasing the size of the phase-shifting point diffraction interferometer reference pinhole. This method is not acceptable because the accuracy of the phase-shifting point diffraction interferometer improves as the reference pinhole gets smaller. An alternative method for balancing the beams involves placing an attenuating membrane in the test-beam window. This method is also not acceptable because of membrane damage and contamination caused by extreme ultraviolet radiation reduces the accuracy of the phase-shifting point diffraction interferometer.

SUMMARY OF THE PRESENT INVENTION

The present invention generally relates to a phase-shifting point diffraction interferometer in which the zeroth-order diffraction of the grating passes through the reference beam pinhole and a first-order diffraction of the grating passes through the test beam window. This arrangement will tend to balance the strength of the two beams because the strong zeroth-order diffraction will pass through the small reference beam pinhole and the weak first-order diffraction will pass through the relatively wide test beam window. In this fashion, the fringe contrast and, as a corollary, the signal to noise of the detected signal are improved.

Because grating ruling errors are imparted to the first-order diffraction beam and not the zeroth-order diffraction beam, it was believed in the prior art that first-order diffraction should be sent through reference pinhole where it is spatially filtered and the zeroth-order diffraction should be sent through the test beam window. The present invention is based, in part, on the recognition that in some situations, the improvement to the fringe contrast outweighs the inaccuracies caused by grating induced aberrations. In a preferred embodiment, a high quality optical grating is used to reduce the induced aberrations of the first-order diffraction.

In one aspect, the present invention is directed to a phase-shifting point diffraction interferometer that uses a grating with a duty cycle other than 50% where, for a binary (opaque and transparent) grating structure, the duty cycle of a grating is the percentage of the grating that is opaque.

In another aspect, when the zeroth-order diffraction is sent to the reference beam pin hole and the first-order diffraction is sent to the test beam window, the duty cycle of the grating is less than 50%. This sends more energy to the zeroth-order diffraction which in turn is attenuated by the reference pinhole, balancing the two interfering beams. The particular preferable duty cycle depends on the aberrations in the optic under test and the size of the reference pinhole.

In a further aspect, in the configuration where the zeroth-order diffraction is sent to the test beam window, the duty cycle of the grating is greater than 50%. This configuration decreases the energy mismatch between the zeroth-order and the first order when compared to the conventional 50% duty cycle configuration. The result will be slightly improved fringe contrast, although in this configuration it is not possible to fully compensate the reference beam losses because the best zeroth-order to first-order power ratio that can be achieved is unity.

BRIEF DESCRIPTION OF THE DRAWING

The present invention may be further understood from the following description in conjunction with the appending drawing. In the drawing.

DETAILED DESCRIPTION OF THE PREFERRED EMBODIMENT

Figure 1:
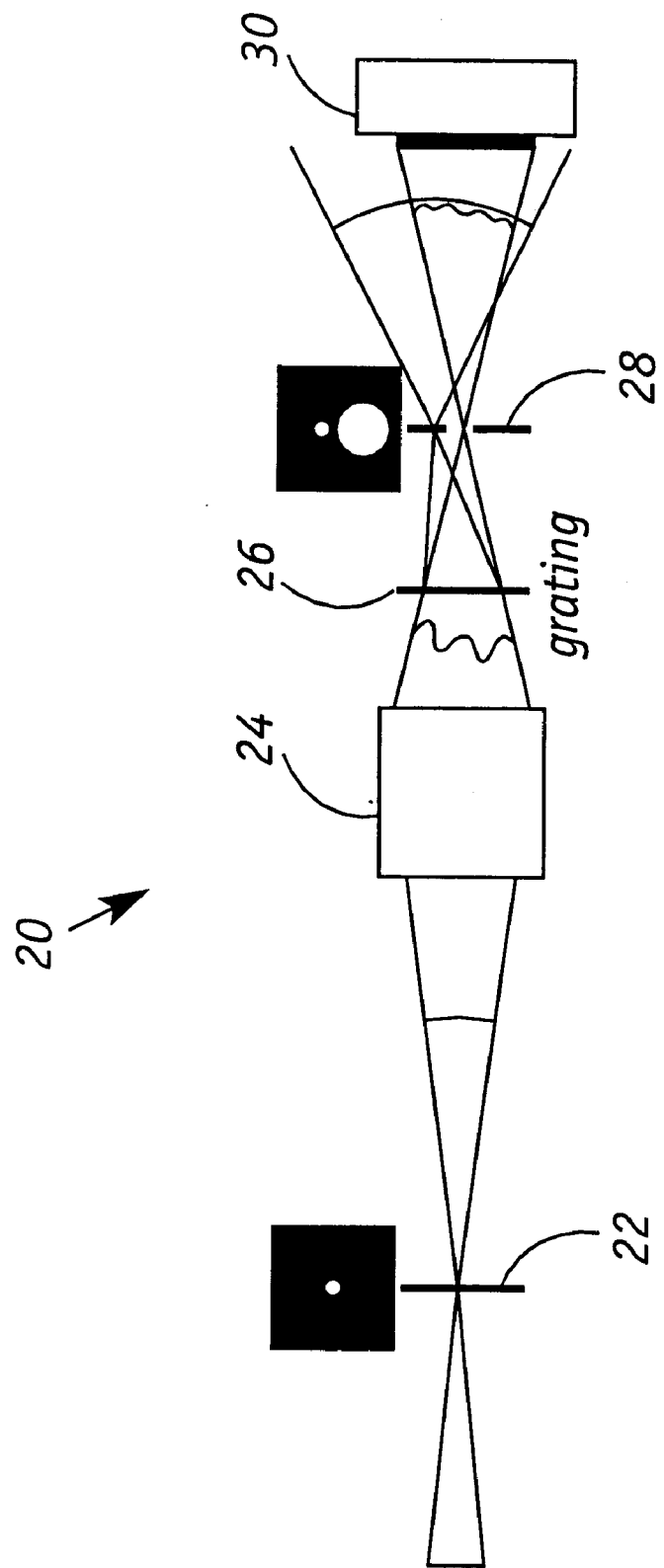
FIG. 1 is a diagram of a prior art phase-shifting point diffraction interferometer.
Figure 2:
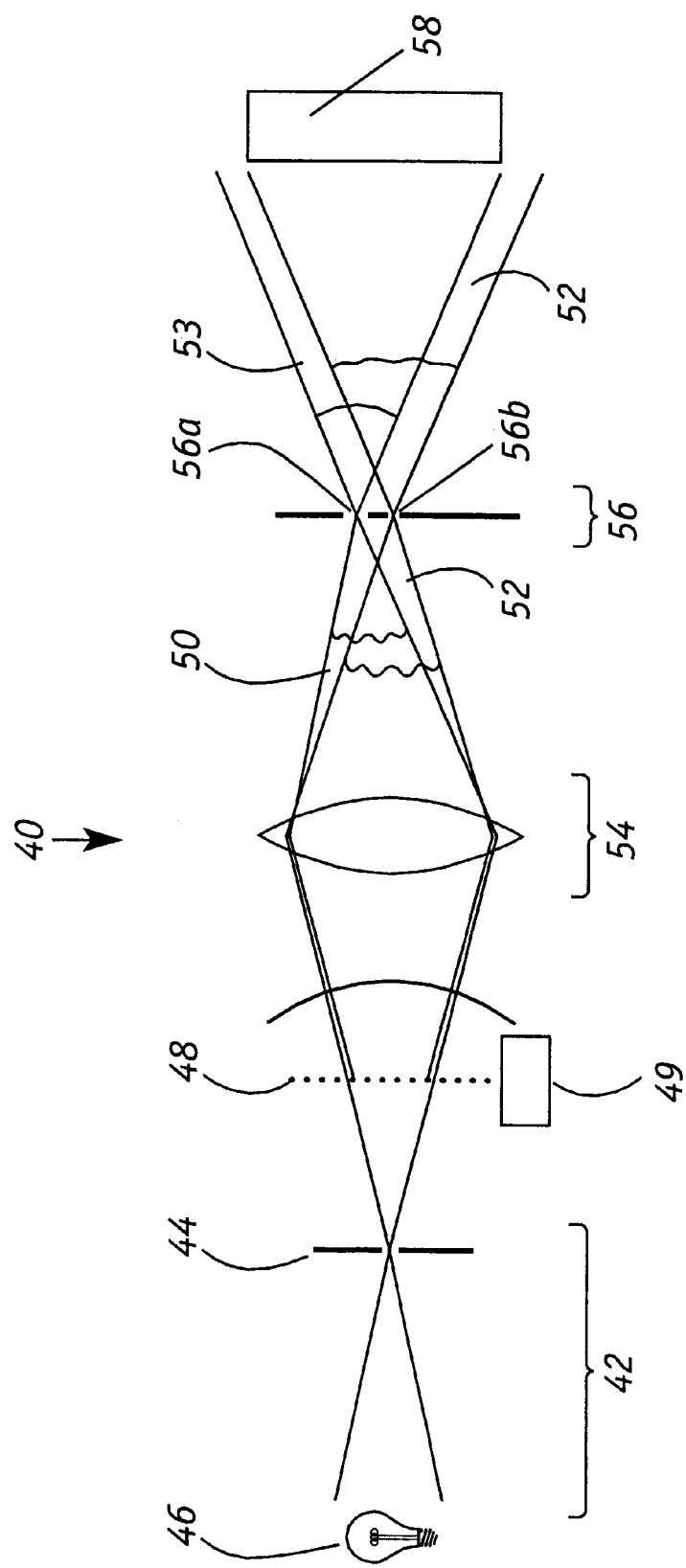
FIG. 2 is a diagram of a phase-shifting point diffraction interferometer that can use the gratings of the present invention, where, for consistency with the current implementation, the system is depicted in its equivalent grating in front of the test optic configuration.

FIG. 2 illustrates a phase-shifting point diffraction interferometer 40 of one embodiment of the present invention. In one embodiment, the electromagnetic energy source 42 includes a pinhole 44 that produces a spatially coherent wave. The source of electromagnetic radiation could also be a laser that is spatially coherent without an input pinhole. The spatially coherent radiation impinges upon a beam splitter 48 that creates replicas of the input beam with a small angular separation. One of these beams is used as the test beam 52 and another as the reference beam 50. The test beam 52 and reference beam 50 pass through the optic under test 54 which is to be evaluated for aberrations.

For the invention described here, the beam splitter is a diffraction grating.

The test optic 54, which may be a mirror, lens, etc., focuses the test beam 50 and reference beam 52 to the image plane. The beam splitter 48 causes the reference beam 50 and test beam 52 to have different laterally separated foci. Thus, the region of maximal intensity for the test beam 50 is separated from the region of maximal intensity for the reference beam 52 at the image plane where the mask 56 is located. Mask 56 is preferably positioned in the image plane. The test beam 50 passes through the relatively large test beam window 56a of the mask 56. This test beam is not substantially spatially filtered. The reference beam 52 goes through the reference pinhole 56b of the mask 56. The reference beam is thus filtered at the image plane, and the reference beam 50 after the mask 56 constitutes a high-quality spherical reference wave 53. The test wave 52 will interfere with the reference wave 53 at the detector 58 to generate the interference pattern. The fringe contrast of the interference pattern will depend on the relative strengths of the reference and test beams at the detector. The fringe contrast reaches a maximum when the reference beam matches the test beam in intensity. Various detectors may be employed including, for example, photosensitive film, a CCD array, and a video camera.

The size of the reference pinhole 56b on the mask 56 significantly influences the accuracy of the point diffraction interferometer. The reference pinhole must be smaller than the diffraction-limited focal spot of the optic under test. Thus, the pinhole diameter should approach the wavelength of the radiation. Additionally, a small pinhole ensures that there is sufficient divergence of the reference beam 53. The angle, in radians, of the radiation emitted from the pinhole covers an angle given by the expression $$\alpha = \frac{1.22\lambda}{d}$$

where $\lambda$ is the radiation wavelength, and d is the diameter of the pinhole. The quality of the reference wave is improved by using a small pinhole at the expense of signal amplitude. A translation of the grating beam splitter 48 in the direction normal to the grating rulings produces a controllable phase shift between any two diffractive orders, and is used to implement phase-shifting interferometry. Between two adjacent orders, a translation of one cycle produces a relative phase shift of $2\pi$ radians, or one wave. Since small beam separations are typically used, the grating can be quite coarse, making fractional cycle translations easily achievable by the translation stage 49.

In one preferred embodiment of the present invention, the test beam 50 corresponds to a first-order diffraction of the grating 48, and the reference beam 52 corresponds to a zeroth-order diffraction of the grating 48. This arrangement is referred to as the zeroth-order-reference configuration.

Conventionally, the opposite arrangement is used in prior art phase-shifting point diffraction interferometers, that is, the first-order diffraction is used as the reference beam and the zeroth-order diffraction is used as the test beam. This arrangement allows aberrations in the first-order diffraction induced by the grating to be removed by way of the reference pinhole. This implementation is called the first-order-reference configuration. Because the grating is positioned after the input spatial filter, any aberrations imparted by the grating will be indistinguishable from those in the test optic. Errors in grating line-placement will manifest themselves as aberrations in the diffracted beam. It may be possible, however, to suppress grating induced error through measurement averaging used in combination with large grating translations.

In the zeroth-order-reference configuration, one can achieve an arbitrarily high reference-to-test-beam magnitude ratio. The relatively weak intensity first-order diffraction is sent through the relatively large test beam window and the strong intensity zeroth-order diffraction is sent through the small reference pinhole. The attenuation effect of the image plane spatial filtering of the reference beam with the reference pinhole is negated by the higher intensity of the zeroth-order diffraction. Thus, the test and reference beam amplitudes can be balanced to provide the optimal fringe contrast. The fringe contrast dictates the signal-to-noise ratio of the measured interferogram.

Although the diffraction induced aberrations can no longer be removed in the zeroth-order-reference configuration, the gratings that are typically used in the phase-shifting point diffraction interferometer are relatively coarse, meaning that they can be fabricated to very high tolerances. The typical grating pitch used in the EUV implementation of the phase-shifting point diffraction interferometer is on the order of 20 $\mu$m; an extreme case of a 10% duty cycle grating (10% opaque regions) would only require 2 $\mu$m line widths. With current electron-beam lithography tools, such dimensions are not difficult to achieve with better than $\lambda/100$ accuracy over areas far exceeding the typical requirements of about 1 mm$^2$, where $\lambda$ is defined as the grating pitch.

Gratings meeting these requirements have recently been produced on the Nanowriter, which is an electron-beam lithography tool, as described in Anderson et al., "Electron beam lithography digital pattern generator and electronics for generalized curvilinear structures," *J. Vac. Sci. & Technol.* B, 13(6) 2529–2534(1995).

In another embodiment of the present invention, the phase-shifting point diffraction interferometer has a grating with a duty cycle other than the conventional 50% duty cycle. In the zeroth-order-reference configuration, the duty cycle is preferably below 50%; this will increase the strength of the zeroth-order reference beam with respect to the first-order. In the first-order-reference configuration, the duty cycle is preferably above 50%; this will decrease the strength of the zeroth-order test beam with respect to the first-order.

Figure 3:
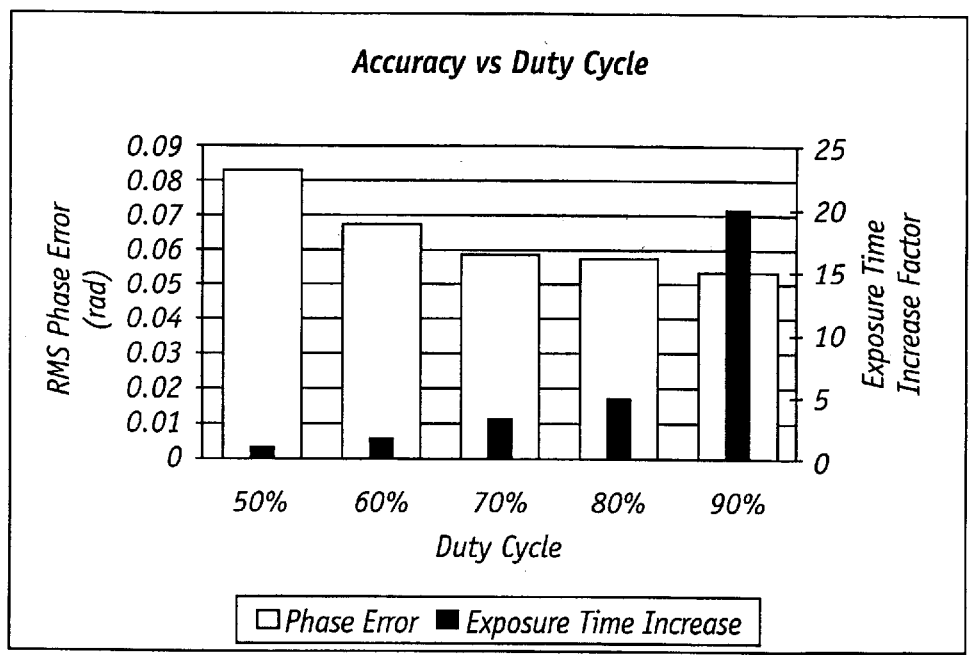
FIG. 3 is a graph of root mean square error versus grating duty cycle for the first-order reference beam case.

In the first-order-reference configuration, increasing the duty cycle of the grating has the effect of equalizing the reference and test beams. At a duty cycle of 90%, the two beams leaving the grating have nearly identical amplitudes. The drawback of this approach is that the optical throughput is severely reduced, hence the exposure time must be increased to compensate. FIG. 3 is a graph of the photon noise limited rms phase error in radians (assuming the exposure is equalized) as a function of grating duty cycle. The graph also shows the exposure time increase factor required to equalize the exposure for each duty cycle. The rms phase error is calculated based on the following assumptions: 30,000 A/D counts of average exposure on the CCD, a CCD well depth of 350,000 electrons, an effective CCD gain of 6.4 electrons per detected photon, a five bucket $\pi/2$ algorithm, and a fringe contrast for the 50% duty cycle case of 5%. These numbers are based on typical experimental parameters. The phase error is calculated using the Brophy method, as described in C. Brophy, "Effect of intensity error correlation on the computed phase of phase-shifting interferometry" *J. Opt. Soc. Am.* A 7 537–541(1990), which is incorporated herein by reference.

The relatively large exposure time required for duty cycles over 80% makes this method less attractive beyond this point. It is possible, however, to increase the photon noise limited accuracy by a factor of about 1.4 by going to a 80% duty cycle grating and increasing the exposure time by a factor of 5.

Figure 4:
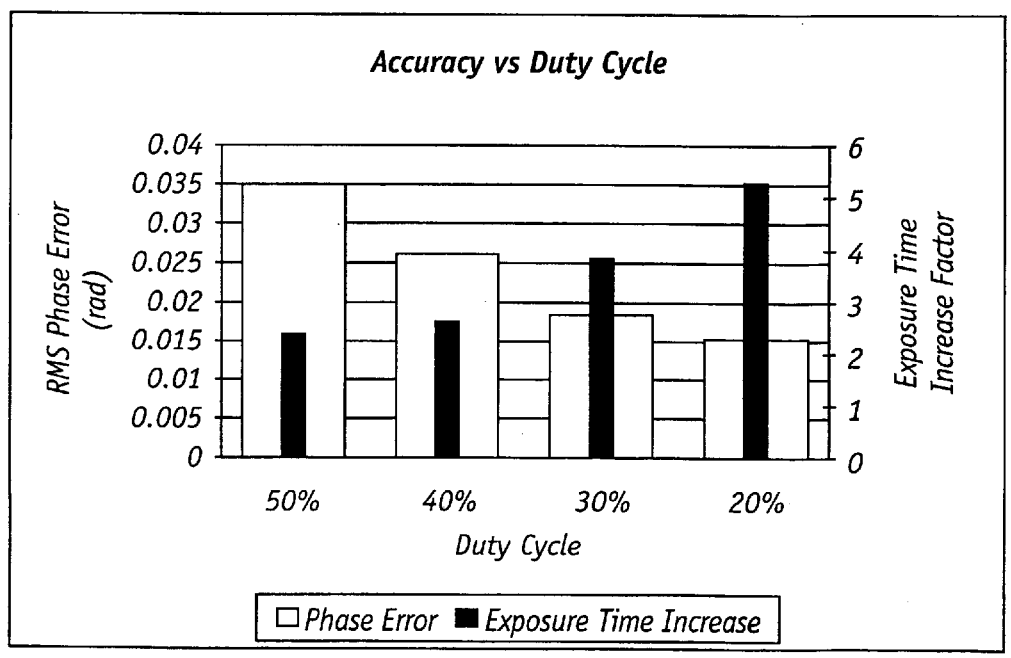
FIG. 4 is a graph of root mean square error versus grating duty cycle for the zeroth-order reference beam case.

As discussed above, the zeroth-order-reference configuration results in a significant increase in contrast even for the 50% duty cycle case. The contrast can be further improved by reducing the duty cycle of the grating (wider clear lines). One might also expect the optical throughput to increase as the grating duty cycle is decreased but this is unfortunately not the case due to the high attenuation of the reference beam (the zeroth-order beam) from spatial filtering and the presence of more energy in higher grating orders. FIG. 4 is a graph of the photon noise limited rms phase error in radians (assuming the exposure is equalized) as a function of grating duty cycle for the zeroth-order reference beam case. Again, the required exposure time increase is also shown. The same assumptions used in FIG. 3 are used here with the contrast being set to 5% for the 50% duty cycle first-order-reference configuration. The 50% duty cycle numbers from FIGS. 3 and 4 can be directly compared showing a photon noise limited accuracy gain of a factor of about 2.4 by reversing the two beams and increasing the exposure by a factor of about 2. FIG. 4 also shows that additional gains can be achieved by reducing the duty cycle. The last entry in the graph shows a total photon noise limited accuracy increase of a factor of 5.5 by going to a 20% duty cycle grating and increasing the exposure time by a factor of 5. A factor of 5 increase in exposure time for the first-order-reference configuration only yielded an accuracy increase of a factor of 1.4.

Figure 5:
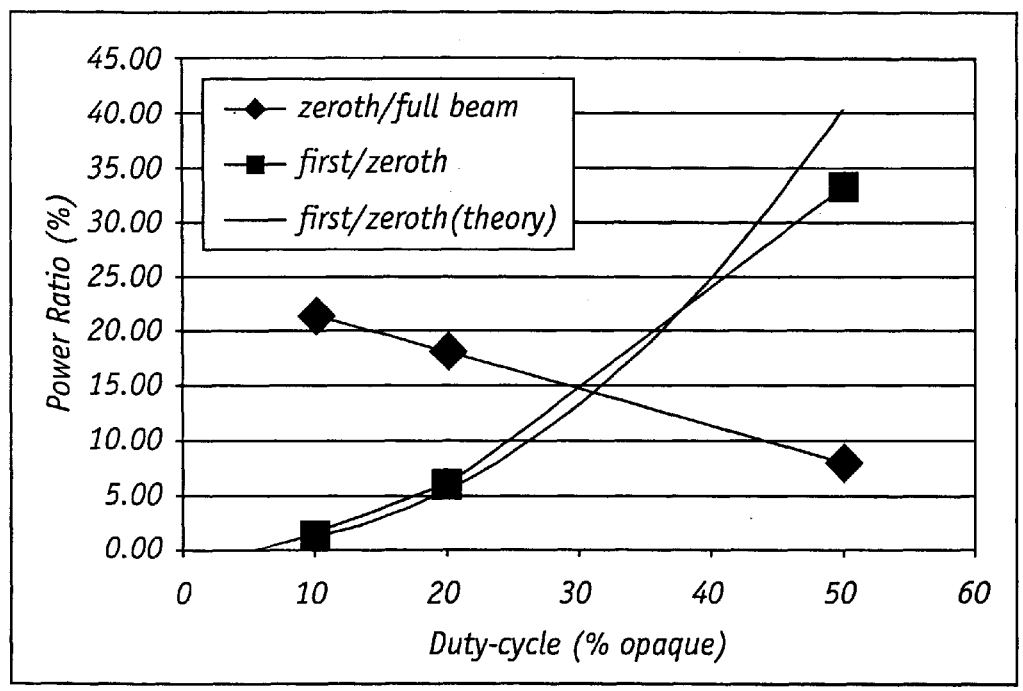
FIG. 5 is a graph of measured and predicted first to zeroth-order power ratio and measured zeroth-order to input (full) beam power ratio.

Table 1 in conjunction with FIG. 5 show the measured power ratios of the zeroth-order to the full beam, and the first-order to the zeroth-order. The table also shows the predicted ratio of the first to zeroth-order power. The zeroth-order to full beam ratio is slightly lower than one would expect for an ideal grating. This discrepancy is largely due to the gratings being patterned onto a 100 nm thick $Si_3N_4$ membrane that is only 43% transmissive at the measurement wavelength of 13.4 nm.

TABLE 1

Measured and predicted first to zeroth-order power ratio and measured zeroth-order to input (full) beam power ratio.

| Grating duty cycle | zeroth/full (%) | first/zeroth (%) | first/zeroth (%) theoretical |
|---|---|---|---|
| 50% | 7.96 | 33.20 | 40.53 |
| 30% | NA | NA | 13.53 |
| 20% | 18.54 | 5.82 | 5.47 |
| 10% | 21.59 | 1.32 | 1.19 |

Figure 6:
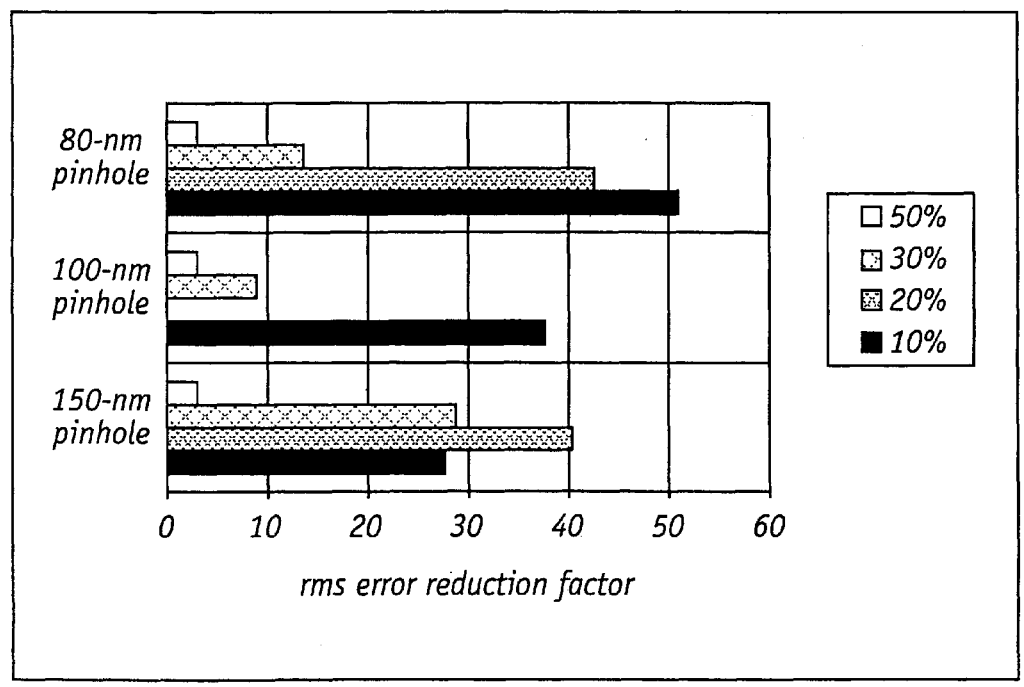
FIG. 6 is a graph illustrating the rms error reduction factor relative to the conventional configuration (50% duty cycle grating first-order reference order reference) as a function of grating duty cycle and reference pinhole size.

Table 2 shows the interferometric fringe contrast as a function of pinhole size for various duty cycle gratings. The optimal grating choice depends on the reference pinhole size and characteristics of the optic under test. The ideal case of 100% fringe contrast requires the power-ratio gain to exactly offset the image-plane spatial-filtering loss that depends on the pinhole size and the point-spread function of the optic under test. Table 2 and FIG. 6 also show the photon-noise-induced rms error reduction factor relative to the conventional configuration (50% duty cycle grating first-order-reference). A conventional five-bucket phase-shifting algorithm was assumed and the average exposure in each case was assumed to be 20,000 photons (half the photon well depth of a typical EUV CCD).

sation of the reference pinhole filtering losses. In this case the reference beam actually becomes stronger than the test beam. From this reversal and from the measured power ratio between the zeroth- and first-order beams, we conclude that the 150-nm reference-pinhole filtering-loss is less than a factor of 75 for the optic tested here.

It was stated above that gratings with adequately high line placement accuracy were available. This statement can readily be verified by comparing wavefront measurement results in the two grating-order configurations. Performing this test for the 20% duty cycle grating shows the grating induced rms wavefront error to be 0.067 nm ($\lambda_{EUV}/200$). The grating-induced 36 Zernike polynomial fit rms wavefront error for the same case is 0.041 nm ($\lambda_{EUV}/330$). The grating-induced error was determined from the rms of the difference wavefront obtained when comparing the wavefronts from the two configurations. The effect of non-grating-induced differences was removed by performing a repeatability test in the first-order-reference configuration and assuming those errors to add in quadrature with the grating induced error.

The specific gains achieved using this method depend strongly on the particular optic being tested. This is due to the fact that the spatial filtering losses depend in large part on the point-spread function of the optic under test. For the results presented here, the optical system had an image-side numerical aperture of 0.08, an operational wavelength of 13.4 nm, and an rms wavefront error of 0.16 waves (2.1 nm or $\lambda_{EUV}/6.25$).

It is evident that moderate photon noise limited accuracy gains could be achieved with the first-order-reference configuration by increasing the grating duty cycle at the cost of exposure. These gains, however, may not be substantial enough to justify the optical throughput loss. For the same optical throughput loss, the zeroth-order-reference configu-

TABLE 2

Interferometric fringe contrast as a function of pinhole size for various duty cycle gratings. Also shown is the rms error reduction factor relative to the conventional configuration (50% duty cycle first-order-reference).

| | 150 nm pinhole | | 100 nm pinhole | | 80 nm pinhole | |
|---|---|---|---|---|---|---|
| Grating Duty Cycle | contrast % | rms error reduction factor* | contrast % | rms error reduction factor* | contrast % | rms error reduction factor* |
| 50% first-order reference | 1.6 | 1.0 | 7.4** | 1.0 | 2.6** | 1.0 |
| 50% zeroth-order reference | 20.3 | 3.1 | 13.0 | 3.1 | 4.5 | 3.0 |
| 30% zeroth-order reference | 62.0 | 28.6 | 22.2 | 9.0 | 9.5 | 13.4 |
| 20% zeroth-order reference | 73.6 | 40.3 | NA | NA | 16.9 | 42.3 |
| 10% zeroth-order reference | 60.6 | 27.3 | 45.2 | 37.3 | 18.5 | 50.6 |

*Photon-noise-induced rms phase error reduction factor relative to the baseline 50% first-order-reference configuration.
**Extrapolated contrast based on pinhole filtering losses determined from the 50% zeroth-order reference configuration data and the measured contrast in the 50% first-order-reference configuration.

It is also important to note that although it was possible to measure a fringe contrast for the 80-nm pinhole case using the 50% duty-cycle grating, the interferograms proved not to be analyzable. This is significant because smaller reference pinholes yield higher accuracy. Using the optimized grating configuration allows smaller reference pinholes to be used.

In the 150-nm (large) reference pinhole case, an interesting reversal of the contrast gains for the lowest duty cycle grating is apparent. This can be attributed to over compenration can provide a much more substantial accuracy improvement. This accuracy improvement comes at the cost of being susceptible to errors in the grating.

Figure 7A:
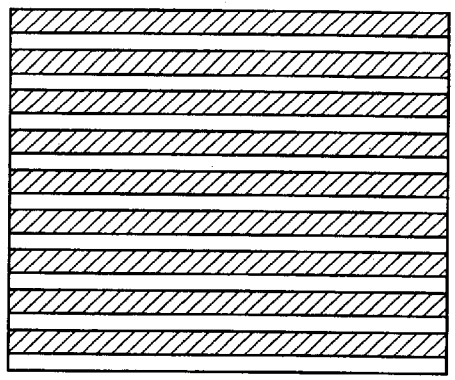
FIG. 7A is a diagram of a conventional diffraction grating with 50% duty cycle.
Figure 7B:
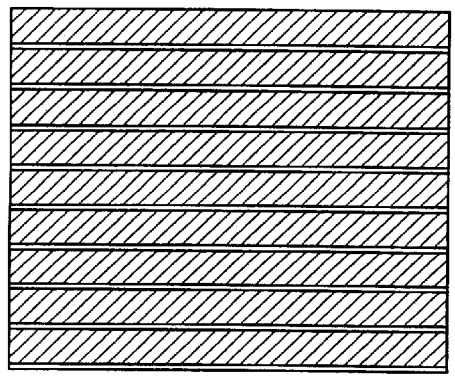
FIG. 7B is a diagram of a diffraction grating with a duty cycle above 50% for use with a first-order-reference configuration of a phase-shifting point diffraction interferometer.
Figure 7C:
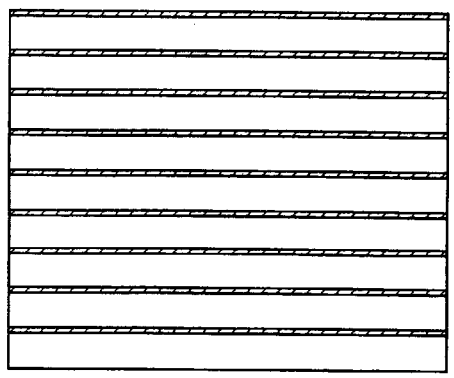
FIG. 7C is a diagram of a diffraction grating with a duty cycle below 50% for use with a zeroth-order-reference configuration of a phase-shifting point diffraction interferometer.
Figure 8A:
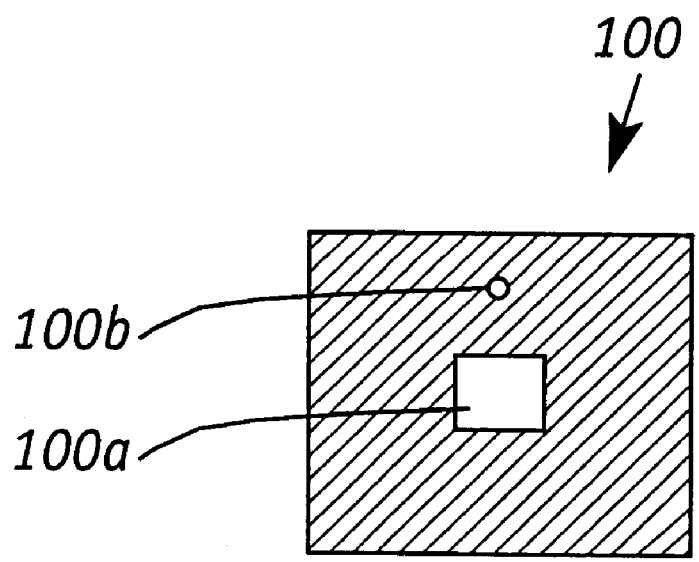
FIG. 8A is a diagram of a mask for use with a first-order-reference configuration phase-shifting point diffraction interferometer.

FIG. 7A is a diagram of a conventional grating with 50% duty cycle;

FIG. 7B is a diagram of a diffraction grating with a duty cycle above 50% for use with a first-order-reference configuration of a phase-shifting point diffraction interferometer;

FIG. 7C is a diagram of a diffraction grating with a duty cycle below 50% for use with a zeroth-order-reference configuration of a phase-shifting point diffraction interferometer;

FIG. 8A is a diagram of a conventional mask 100 for use with a first-order-reference configuration phase-shifting point diffraction interferometer. The test beam window 100a is in the center of the mask for receiving the zeroth-order test beam.

The reference pinhole 100b is positioned to be at the center of a first-order diffraction of the grating.

Figure 8B:
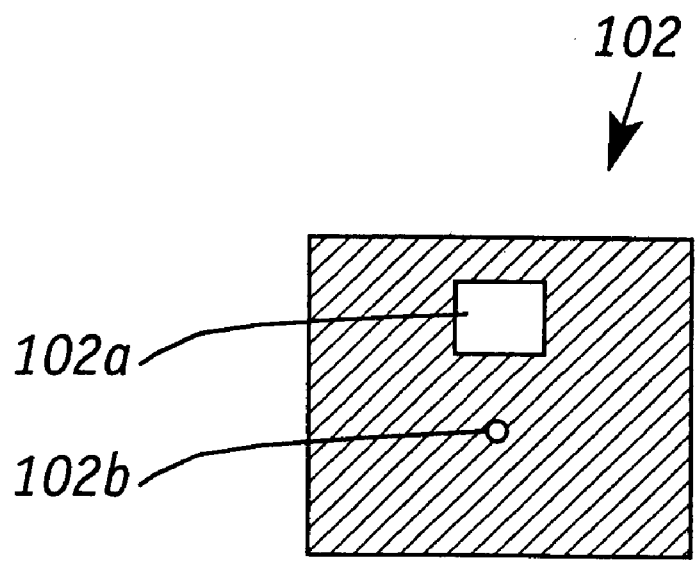
FIG. 8B is a diagram of a mask for use with the zeroth-order-reference configuration phase-shifting point diffraction interferometer.

FIG. 8B is a diagram of a mask 102 for use with a zeroth-order-reference configuration phase-shifting point diffraction interferometer. In this configuration, the reference pinhole 102b is at the center of the mask where the zeroth-order beam goes. The test beam window 102a is located at the center of a first-order diffraction of the grating. Additional mask designs for the zeroth-order-reference configuration are described in the U.S. patent application, "Phase-Shifting Point Diffraction Interferometer Mask Designs", inventor K. Goldberg, Ser. No. 09/176,617 (corresponding to Attorney Docket No. 015780-025), which was filed on the same day as the present application, and which is incorporated herein by reference.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A point diffraction interferometer system defining an optical path comprising:

a source of extreme ultraviolet (EUV) radiation in the optical path;

a diffraction grating in the optical path for dividing EUV radiation from the source into a reference beam and a test beam wherein the diffraction grating has a duty cycle of 20% or less;

at least one optical element under test in the optical path;

a mask in the optical path positioned in an image plane; and a detector in the optical path positioned after the mask; wherein the mask defines a test beam window and at least one reference beam pinhole that has a diameter of 100 nm or less, wherein the diffraction grating diffracts a first-order diffraction of radiation to the test beam window and the zeroth-order diffraction to the reference pinhole.

2. The point diffraction interferometer system of claim 1, wherein the diffraction grating is a transmission-type diffraction grating.

3. The point diffraction interferometer system of claim 2, wherein the diffraction grating is positioned between the source and the optical system under test, or between the optical system under test and the image plane mark.

4. The point diffraction interferometer system of claim 2, wherein the image plane includes a focal point of the reference beam passing through at least one optical element.

5. The point diffraction interferometer system of claim 2, wherein the source includes an input pinhole.

6. The point diffraction interferometer system of claim 1, wherein the diffraction grating is positioned between the source and the optical system under test, or between the optical system under test and the image plane mask.

7. The point diffraction interferometer system of claim 1, wherein the image plane includes a focal point of the reference beam passing through at least one optical element.

8. The point diffraction interferometer system of claim 1, wherein the source includes an input pinhole.

* * * * *